United States Patent [19]
Ishiguro et al.

[11] Patent Number: 5,862,272
[45] Date of Patent: Jan. 19, 1999

[54] IMAGE DETECTOR

[75] Inventors: Keizo Ishiguro, Nara; Minoru Nishioka, Kobe; Hironori Nakano, Neyagawa; Toshio Makabe, Osaka, all of Japan

[73] Assignee: Matsushita Electric Industrial Co., Ltd., Japan

[21] Appl. No.: 841,584

[22] Filed: Apr. 30, 1997

[30] Foreign Application Priority Data

Apr. 30, 1996 [JP] Japan .................................... 8-108325

[51] Int. Cl.⁶ ...................................................... G06K 9/20
[52] U.S. Cl. .......................................................... 382/312
[58] Field of Search .................................... 382/312, 313, 382/316, 318, 319, 320, 321, 322, 323, 324, 282, 181, 182, 183, 185, 187, 229

[56] References Cited

U.S. PATENT DOCUMENTS

| | | | |
|---|---|---|---|
| 4,819,083 | 4/1989 | Kawai et al. | 382/312 |
| 5,748,808 | 5/1998 | Taguchi et al. | 382/312 |
| 5,777,755 | 7/1998 | Aoki et al. | 382/312 |

*Primary Examiner*—Jose L. Couso
*Attorney, Agent, or Firm*—Parkhurst & Wendel, LLP

[57] ABSTRACT

In the image detector according to the present invention, a signal processing block generates a video signal by processing a pickup image signal corresponding to an image of an object which is picked up by an image pickup block and a motion detection block detects variations per unit time of luminance or a color of a portion or a whole of an image formed on the basis of the video signal as character variables of the image. A character analyzing block divides the video signal generated by the signal processing block into signals at durations each having the same character variable of the image detected by a motion detection block, and adds, to each of the divided video signals, an importance degree determined according to the character variables of the image and a duration of the signal, thereby making it possible to save memory capacities, accelerate retrieval of pickup images and enhance utilization efficiencies of transmission systems for lessening loads.

14 Claims, 11 Drawing Sheets

IMAGE DETECTOR

FIELD OF THE INVENTION

The present invention relates to an image detector which detects only aimed images out of images picked up by an image pickup device.

BACKGROUND OF THE INVENTION

A large number of methods have conventionally been proposed for reducing amounts of information in recording image data obtained with image pickup devices such as TV cameras into storage devices such as memories.

Image compressing techniques which are typically represented by JPEG and MPEG are currently known as techniques for reducing amounts of image data. Images can be compressed on the order of $\frac{1}{30}$ without remarkably degrading image qualities by using, for example, the MPEG technique.

Figure 10:
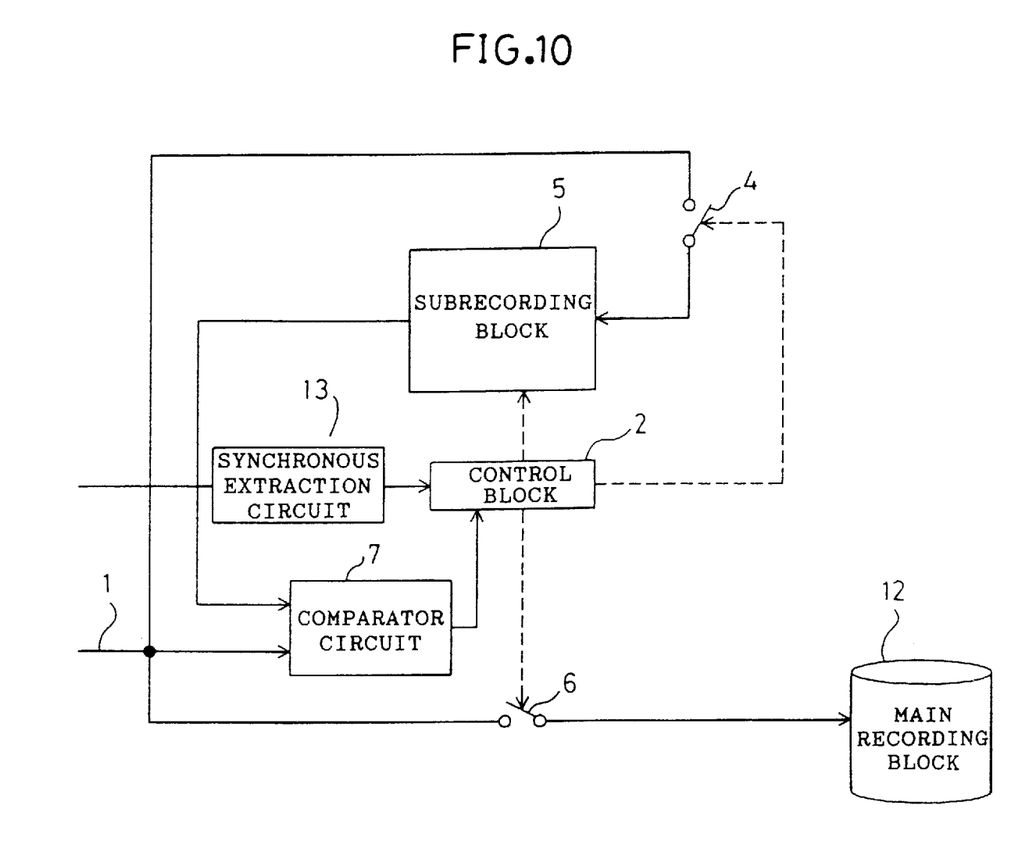
FIG. 10 is a block diagram illustrating a configuration of an image detector utilizing the conventional image data reducing method.

Further, a data reducing technique adopted for an image recorder disclosed by Japanese Patent Application Laid-Open No. 63-217786 can be mentioned as another technique for reducing amounts of image data. This image recorder is configured, as shown in FIG. 10, to lead a video signal 1 picked up by a monitor camera or similar means into a comparison input of a comparator circuit 7, and into a subrecording block 5 and a main recording block 12 through a switch 4 and another switch 6. Furthermore, the video signal is added from the sub-recording block 5 to a standard input of the comparator circuit 7 and an output from the comparator circuit 7 is input into a control block 2. The control block 2 is caused to control the switches 4 and 6 as well as readout from the sub-recording 5 by inputting a synchronous signal which is extracted by a synchronous extraction circuit 13, into the control block 2. An image signal picked up by the sub-recording block 5 is recorded temporarily as a previous value, the recorded image signal is compared with an image signal which is subsequently picked up and an image signal differentiated according to a comparison result is recorded in the main recording block 12. A recording capacity of the main recording block is reduced as described above.

Figure 11:
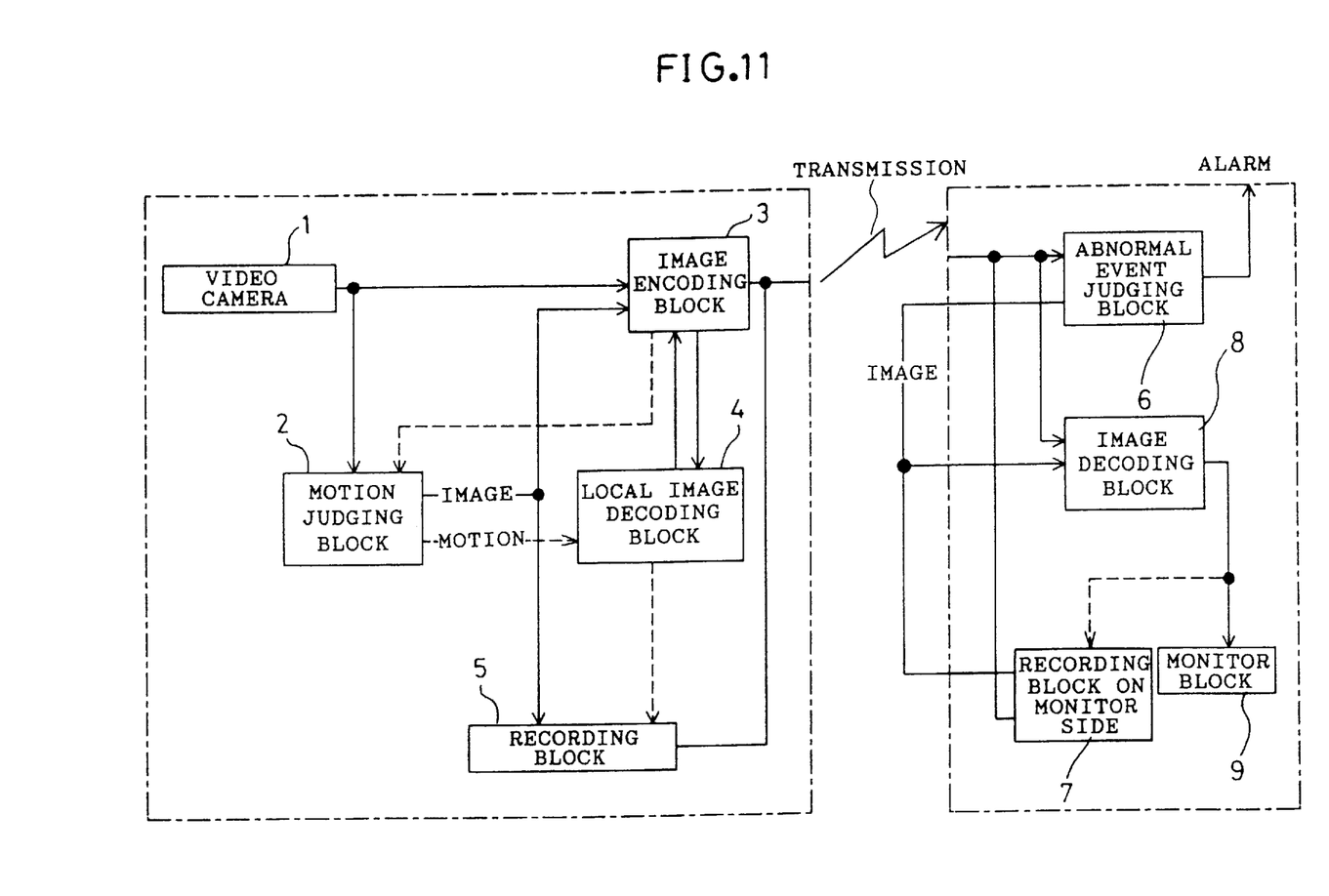
FIG. 11 is a block diagram illustrating a configuration of an image detector utilizing another image data reducing method.

A data reducing technique used in a theft-preventive monitor disclosed by Japanese Patent Application Laid-Open No. 7-231442 can be mentioned as still another technique for reducing amounts of image data. In this theft-preventive monitor, as shown in FIG. 11, input image data from video camera 1 of a theft-preventive unit, which is installed at a location under the monitor, is input into a motion judging block 2 and an image encoding block 3. The motion judging block 2 detects motion data and judges whether or not an object under the monitor moves. Only when the motion judging block 2 judges that the object moves, the image encoding block 3 outputs image data reproduced by a local image decoding block 4 to a data recording block 5 for recording the image data. Only when the object under monitor moves, the image encoding block 3 transmits encoded data to the theft-preventive unit disposed at the location under monitor. An abnormal event judging block 6 receives this data and generates an alarm signal when it judges the movement as an abnormal event. Simultaneously, an image decoding block 8 decodes the encoded data, and a recording block 7 on a monitor side records an image and displays the image on a monitor block 9. The theft-preventive monitor reduces amounts of image data to be recorded as described above.

However, the known image detectors have defects which are described below.

First, the method which reduces amounts of image data using the compressing technique represented by MPEG must process data in an amount of 4 Mbps even in a compressed condition on the order of $\frac{1}{30}$ since an original amount of image data is remarkably large and requires, for example, a memory of approximately 43 G bytes for recording the data continuously for a period of 24 hours. Such a large memory requirement hardly allows an image detector to be manufactured at a low cost using a random access memory under the present conditions.

Further, continuity in time is lost in data recorded by a method that records only differentiated images or moving images like those adopted for the image recorder as shown in FIG. 10 and disclosed by Japanese Patent Application Laid-Open No. 63-217786, or the theft-preventive monitor as shown in FIG. 11 and disclosed by Japanese Patent Application Laid-Open No. 7-231442. Although the method effectively reduces amounts of image data. The importance of images on a divalent basis, i.e., whether or not the images are different from each other or whether or not an image moves, presents a problem in that it may allow important data to be effaced when an attempt is made to record new data while automatically effacing data in the event where a capacity of the recording medium is exceeded.

DISCLOSURE OF THE INVENTION

The present invention has been achieved in view of the defects described above and has a primary objective to provide an image detector that is capable of detecting images of higher importance, or selectively detecting images of higher importance, while effacing unnecessary data so that only data of higher importance remains in a memory in recording image data in the memory. This makes it possible to economically use memory capacities, accelerate retrieval operations by recording a required minimum amount of data in a memory, lessen the load on a transmission system by lowering the spacial ratio occupied by the transmission system. This also enhances the utilization efficiency in transmitting picked up images and transmitting important image data free from degradation in quality thereof.

To accomplish this object, an image detector in as an embodiment of the present invention comprises an image pickup block which outputs a pickup image signal corresponding to an image of an object picked up by an image pickup device by way of a lens, a signal processing block which generates a video signal corresponding to the pickup image signal by performing a predetermined processing of the pickup image signal provided from the image pickup block, a character detection block which detects variations per unit time of luminance or a color of a portion or a whole of an image formed on the basis of the video signal provided from the signal processing block as character variables of the image, and a character analyzing block which divides the video signal provided from the signal processing block into signals at durations each having the same character variable on the basis of the character variables provided from the character detection block and outputs the divided video signals after performing characterizing processing thereof, and is characterized in that the character analyzing block is configured to add, to each of the divided video signals, an importance degree determined according to the character variables of the image and a measured duration of the signal as characterizing processings.

In the image detector which has the configuration described above, the signal processing block generates the video signal by processing the pickup image signal corresponding to the image of the object provided from the image pickup block and the character detection block detects the variations per unit time of the luminance or color of the portion or the whole of the image as character variables of the image corresponding to the video signal. The character analyzing block divides the video signal generated by the signal processing block into the signals at durations each having the same character variable detected from the image by the signal processing block and outputs the divided video signals after adding an importance degree determined according to the character variables of the image and a duration of the image to each of the video signals.

An image detector in another embodiment of the present invention comprises an image pickup block which outputs a pickup image signal corresponding to an image of an object picked up by an image pickup device by way of a lens, a signal processing block which generates a video signal corresponding to the pickup image signal by performing a predetermined processing of the pickup image signal provided from the image pickup block, a character detection block which detects variations per unit time of a spatial movement of a portion or a whole of an image formed on the basis of the video signal provided from the signal processing block as character variables of the image, and a character analyzing block which divides the video signal provided from the signal processing block into signals at durations each having the same character variable and outputs the divided signals after performing characterizing processings thereof, and is characterized in that the character detection block is configured to detect variations of a length of a movement vector of the image as character variables of the image and that the character analyzing block is configured to add, to each of the divided video signals, an importance degree determined according to the character variables of the image and a measured duration of the signal as the characterizing processings.

In the image detector having the configuration described above, the signal processing block generates the video signal by processing the pickup image signal corresponding to the image of the object provided from the image pickup block and the character detection block detects, on the basis of the image corresponding to the video signal, variations per unit time of the length of the spatial movement vector of a portion or a whole of the image as character variations of the image. The character analyzing section divides the video signal generated by the signal processing block into signals at durations each having the same character variable, and outputs the divided video signals after adding an importance degree determined according to the character variables of the image and a measured duration of the signal to each of the divided video signals.

An image detector in yet another embodiment of the present invention comprises an image pickup block which outputs a pickup image signal corresponding to an image of an object picked up by an image pickup device by way of a lens, an image processing block which generates a video signal corresponding to the pickup image signal by processing the pickup image signal provided from the image pickup block, a character detection block which detects variations per unit time of a color of a portion or a whole of an image formed on the basis of the video signal provided from the signal processing block as character variables of the image, and a character analyzing block which divides the video signal provided from the signal processing block into signals at durations each having the same character variable on the basis of the character variables provided from the character detection block, and outputs the divided video signals after performing characterizing processings thereof, and is characterized in that the character detection block is configured to detect variations of a skin color on a screen as the character variables of the image, and that the character analyzing block is configured to add, to each of the divided video signals, an importance degree determined according to the character variables of the image and a measured duration of the signal.

In the image detector having the configuration described above, the signal processing block generates the video signal by processing the pickup image signal corresponding to the image of the object provided from the image pickup block and the character detection block detects variations of the skin color per unit time of a portion or a whole of the image on the screen as the character variables of the image on the basis of the image corresponding to the video signal. The character analyzing block divides the video signal generated by the signal processing block into the signals at durations each having the same character variable detected by the character detection block, and outputs the divided video signals after adding, to each of the divided video signals, an importance degree determined according to the character variables of the image and a measured duration of the signal.

In an embodiment, an image detector of the present invention comprises an image pickup block which outputs a pickup image signal corresponding to an image of an object picked up by an image pickup device by way of a lens, a signal processing block which generates a video signal by processing the pickup image signal provided from the image pickup block, a character detection block which detects variations per unit time of a volume of a sound detected from the object as character variables of the object, and a character analyzing block which divides, on the basis of the character variables provided from the character detection block, the video signal provided from the signal processing block into signals at durations each having the same character variable of the object and outputs the divided video signals after performing characterizing processings thereof, and is characterized in that the character analyzing block is configured to add, to each of the divided video signals, an importance degree determined according to the character variables of the image of the object and a measured duration of the image.

In the image detector having the configuration described above, the signal processing block generates the video signal by processing the pickup image signal corresponding to the image of the object provided from the image pickup block and the character detection block detects variations of the sound detected from the object as the character variables of the object. The character analyzing block divides the video signal generated by the signal processing block into signals at durations each having the same character variable of the image of the object detected by the character detection block, and outputs the divided video signals after adding, to each of the divided video signals, an importance degree determined according to the character variables of the object and a duration of the image.

In another embodiment, an image detector of the present invention comprises an image pickup block which outputs a pickup image signal corresponding to an image of an object picked up by an image pickup device, a signal processing block which generates a video signal corresponding to the pickup image signal through a predetermined processing of the image pickup signal provided from the image pickup block, a character detection block which detects variations per unit time of a distance to the object as character variables of the object, and a character analyzing block which divides the video signal provided from the signal processing block into signals at durations each having the same character variable of the object on the basis of the character variables provided from the character detection block and outputs the divided video signals after performing characterizing processings thereof, and is characterized in that the character analyzing block is configured to add, to each of the divided video signals, an importance degree determined according to the character variables of the image of the object and a measured duration of the image as the characterizing processings.

In the image detector having the configuration described above, the signal processing block generates a video signal by processing the pickup image signal corresponding to the image of the object provided from the image pickup block and the character detection block detects variations per unit time of the distance to the object as characteristic variables of the object. The character analyzing block divides the video signal generated by the signal processing block into signals at durations each having the same character variable of the image of the object detected by the character detection block, and outputs the divided video signals after adding an importance degree determined according to the character variables of the object and duration of the image to each of the divided video signals.

In still another embodiment, an image detector of the present invention comprises an image pickup block which outputs a pickup image signal corresponding to an object whose image is picked up by an image pickup device by way of a lens, a signal processing block which generates a video signal corresponding to the pickup image signal through a predetermined processing of the pickup image signal provided from the image pickup block, a motion detection block which detects variations per unit time of a spatial motion of a portion or a whole of an image formed on the basis of the video signal provided from the signal processing block, and an image working block which outputs the video signal provided from the motion detection block after performing a working processing of the video signal on the basis of the variations of the image provided from the motion detection block, and is characterized in that the motion detection block is configured to detect variations of a length of a motion vector of the image as variations of the image, and that the image working block is configured to judge a moving state or a stationary state of the image by comparing the variations of the image provided from the motion detection block with a predetermined set value and leave the video signal as it is in the moving state or add a measured duration of the image in the stationary state to the original video signal as the image working processing.

In the image detector having the configuration described above, the image working block judges the moving state or the stationary state by comparing with a predetermined set value, variations of the image detected by the motion detection block according to the variations of the length of the motion vector and outputs the video signal obtained through the processing by the signal processing block on the basis of the pickup image signal provided from the image pickup block corresponding to the image of the object with no modification in the moving state or adds a measured duration of the image to the original video signal in the stationary state.

In a preferable embodiment of the present invention, the character analyzing block is capable of outputting the video signal processed by the signal processing block on the basis of the pickup image signal corresponding to the image of the object which is provided from the image pickup block in a condition where importance degrees determined according to the character variables corresponding to its variations detected by the character detection block and durations each having the same character variable of the video signal are added.

Further, the character analyzing block is capable of outputting the video signal processed by the signal processing block on the basis of the pickup image signal corresponding to the image of the object which is provided from image pickup block in a condition where importance degrees determined according to the character variables of the image of the object detected by the character detection block as the variations of a sound of the object and a duration of the video signal within a period where the object has the same character variable are added.

Furthermore, the character analyzing block is capable of outputting a video signal processed by the signal processing block on the basis of the pickup image signal corresponding to the image of the object provided from the image pickup block in a condition where importance degrees determined according to the character variables of the object detected by the character detection block as the variations of a distance from the object to the image and a duration of the video signal within a period where the object has the same character variable are added.

Moreover, the image working block is capable of judging the moving condition or the stationary condition of the image by comparing variations of an image detected by the motion detection block according to variations of a length of a motion vector of the video signal with a predetermined set value and outputting the video signal as it is when the image is in the moving state or adding a measured duration of the image in the stationary state to the original video signal.

Accordingly, the image detector according to the present invention is capable of detecting images of higher importance or selectively detecting images of higher importance while effacing unnecessary images so that only important data remains in a memory for recording picked up images in the memory, thereby making it possible to economically use memory capacities, accelerate operations for retrieving picked up images in memories by recording required minimum amounts of data in memories, lessen a load on a transmission system by reducing a spatial ratio occupied by the transmission system for enhancing its operating efficiency and transmit important image data free from degradation of quality.

DESCRIPTION OF THE EMBODIMENTS

Preferable embodiments of the present invention are illustrated in FIGS. 1 through 9.

A first embodiment of the image detector according to the present invention will be described.

Figure 1:
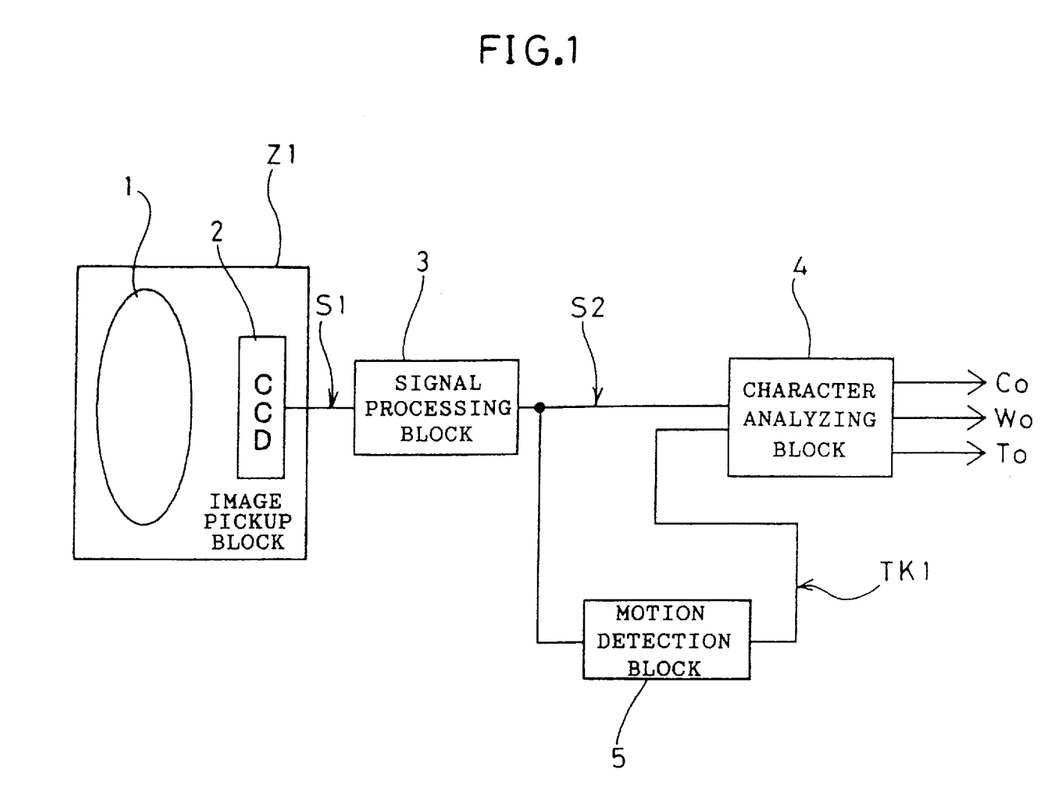
FIG. 1 is a block diagram illustrating a configuration of a first embodiment of the image detector according to the present invention.

FIG. 1 shows a configuration of the first embodiment of the image detector according to the present invention. In FIG. 1, a reference numeral Z1 represents an image pickup block which is composed of a lens 1 and an image sensor 2 used as an image pickup device, a reference numeral 3 designates a signal processing block, a reference numeral 4 denotes a character analyzing block, and a reference numeral 5 represents a motion detection block adopted as a character detection block.

Now, description will be made of operations of the image detector composed of the blocks mentioned above.

Figure 7:
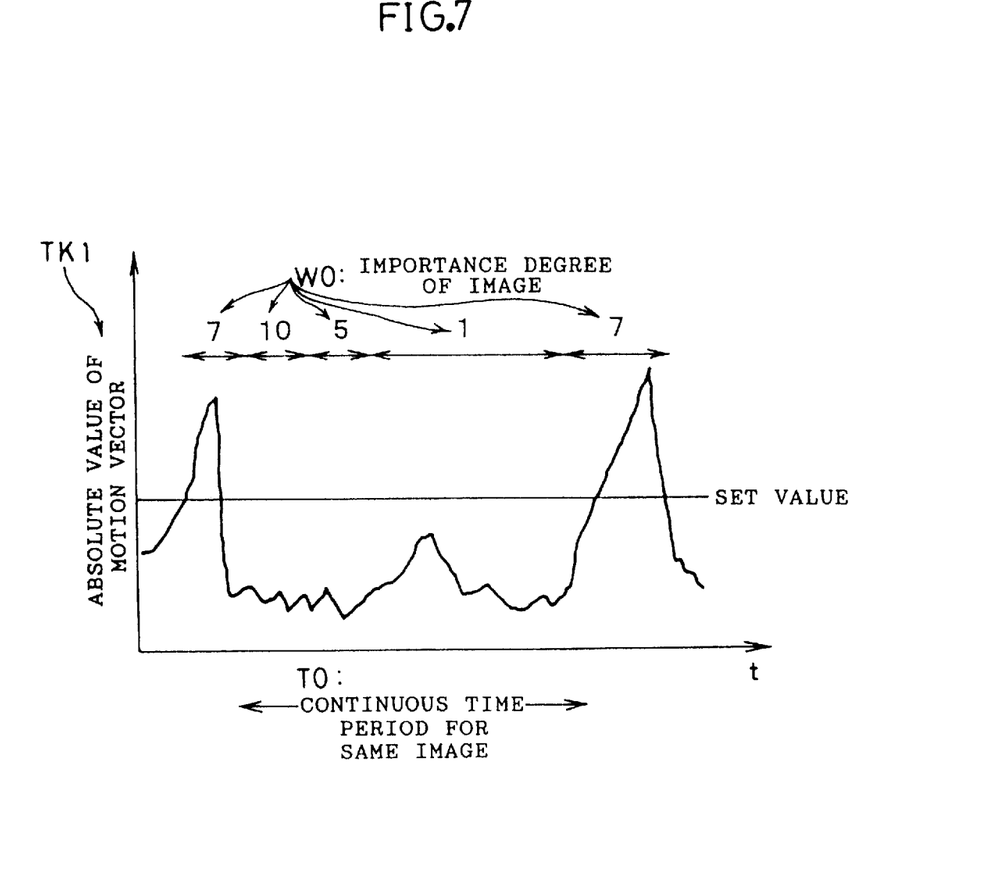
FIG. 7 is a graph descriptive of operations of the first embodiment of the present invention.

In FIG. 1, the image pickup block Z1 outputs a pickup image signal S1 corresponding to an image of an object picked up by the image sensor 2 by way of the lens 1. The signal processing 3 block generates a video signal S2 corresponding to the pickup image signal S1 through a predetermined processing of the pickup image signal S1 provided from the image pickup block Z1. The motion detection block 5 detects variations per unit time of a portion or a whole of an image formed on the basis of the video signal S2 from the signal processing block 3 as character variables TK1 of the image. On the basis of the character variables TK1 provided from the signal processing block 3, the character analyzing block 4 divides the video signal S2 from the signal processing block 3 into signals at durations each having the same character variable, and outputs divided video signals after performing characterizing processings of divided video signals CO. The motion detection block 5 detects variations of the image, or variations of a length of a motion vector of the image, as the character variables TK1 as shown in FIG. 7. The character analyzing block 4 outputs, as shown in FIG. 7, the divided video signals CO after adding, to each of the divided video signals CO, an importance degree WO determined according to the character variables TK1 and a measured duration TO of the divided video signal CO as the characterizing processings.

In the first embodiment of the image detector, the character analyzing block 4 can be configured to give a maximum value, as the importance degree WO to be added to each of the divided video signals CO, to an image having a length of a motion vector of the video signal S2 which exceeds a predetermined set value, for example, continuously for a first predetermined set time and then continuously for a second set time.

Now, a second embodiment of the image detector according to the present invention will be described.

Figure 2:
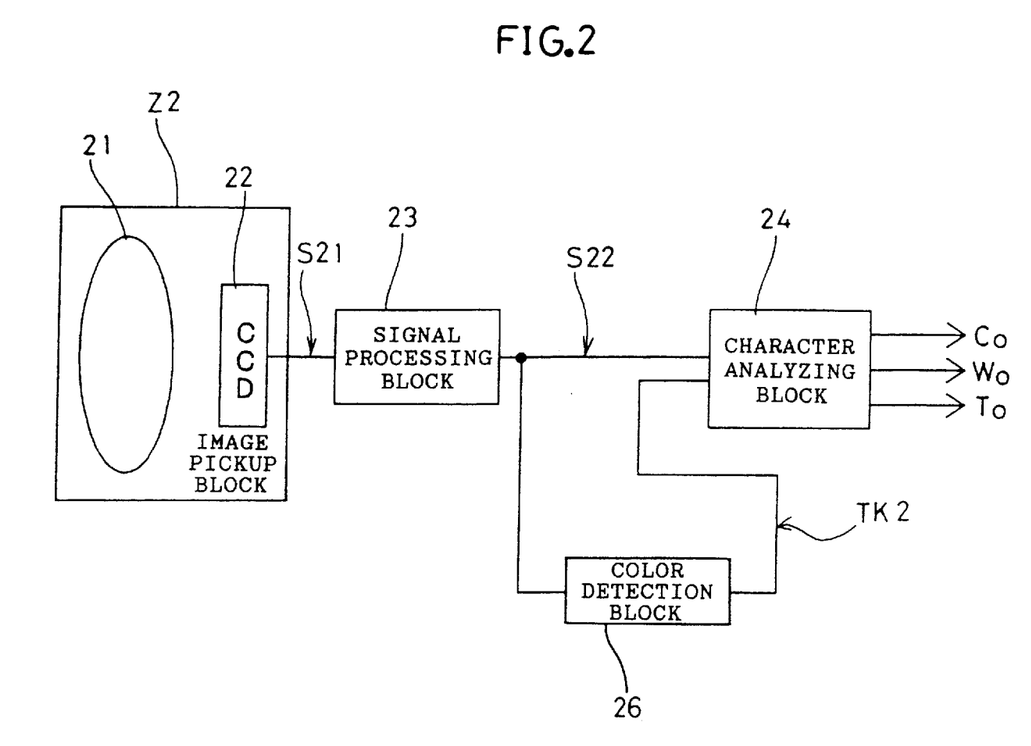
FIG. 2 is a block diagram illustrating a configuration of a second embodiment of the image detector according to the present invention.

FIG. 2 shows a configuration of the second embodiment of the image detector according to the present invention. In FIG. 2, a reference numeral Z2 represents an image pickup block which is composed of a lens 21 and an image sensor 22 used as an image pickup device, a reference numeral 23 designates a signal processing block, a reference numeral 24 denotes a character analyzing block and a reference numeral 26 represents a color detection block adopted as a character detection block.

Description will be made of operations of the image detector composed of the blocks mentioned above.

In FIG. 2, the image pickup block Z2 outputs a pickup image signal S21 corresponding to an image of an object picked up by the image sensor 22 by way of the lens 21. The signal processing block 23 generates a video signal S22 corresponding to the pickup image signal S21 through a predetermined processing of the pickup image signal S21 provided from the image pickup block Z2. The color detection block 26 detects, as character variables TK2 of the image, variations per unit time of luminance or a color of a portion or a whole of an image formed on the basis of the video signal S22 provided from the signal processing block 23. On the basis of the character variables TK2 provided from the color detection block 26, the character analyzing block 24 divides the video signal S22 provided from the signal processing block 23 into signals at durations TO each having the same character variable and outputs divided video signals CO after performing characterizing processings of divided video signals CO. As the characterizing processings, the character analyzing block 24 adds, to each of the divided video signals CO, an importance degree WO determined according to the character variables TK2 of the divided video signals CO and a measured duration TO of the signal.

In the second embodiment of the image detector, the color detection block 26 may be configured to detect, as the character variables TK2, variations per unit time of a skin color of a portion or a whole of the image formed on the basis of the video signal S22 provided from the signal processing block 23, and the character analyzing block 24 may be configured to divide the video signal S22 from the signal processing block 23 into signals at durations TO each having the same character variable based on the character variable TK2 from the color detection block 26, and add an importance degree WO determined according to the character variables TK2 of the divided video signals CO and a measured duration TO of the video signal CO to each of the divided video signals as the characterizing processings.

A third embodiment of the image detector according to the present invention will be described.

Figure 3:
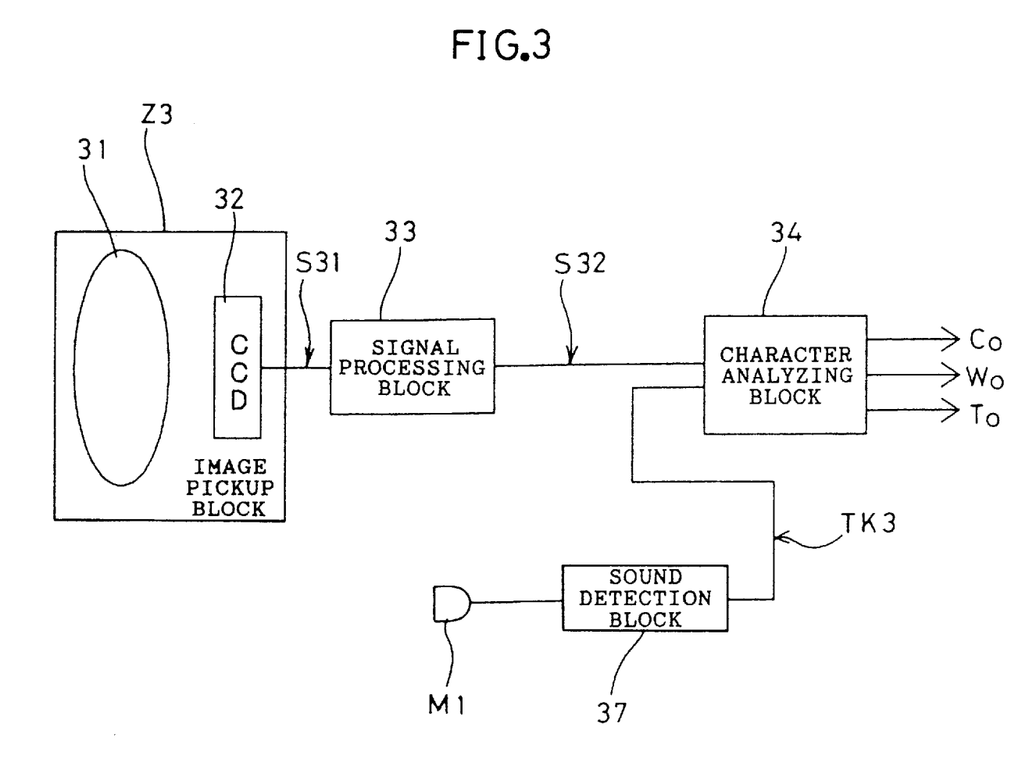
FIG. 3 is a block diagram illustrating a configuration of a third embodiment of the image detector according to the present invention.

FIG. 3 shows a configuration of the third embodiment of the image detector according to the present invention. In FIG. 3, a reference numeral Z3 represents an image pickup block which is composed of a lens 31 and an image sensor 32 used as an image pickup device, a reference numeral 33 designates a signal processing block, a reference numeral 34 denotes a character analyzing block, and a reference numeral 37 represents a sound detection block adopted as a character detection block.

Description will be made of operations of the image detector which is composed of the blocks mentioned above.

In FIG. 3, the image pickup block Z3 outputs a pickup image signal S31 corresponding to an image of an object picked up by the image sensor 32 by way of the lens 31. The signal processing block 33 generates a video signal S32 corresponding to the pickup image signal S31 by performing a predetermined processing of the pickup image signal S31 provided from the image pickup block Z3. The sound detection block 37 detects variations per unit time of a volume of a sound of the object detected from the object through a microphone M1 as character variables TK3 of the object. On the basis of the character variables TK3 provided from the sound detection block 37, the character analyzing block 34 divides the video signal S32 provided from the signal processing block 33 into signals at durations TO each having the same character variable and outputs divided video signals CO after performing characterizing processings of the divided video signals CO. As the characterizing processings, the character analyzing block 34 adds. to each of the divided video signals, an importance degree WO determined according to the character variables TK3 of the image CO and a measured duration TO to each of divided video signals CO.

Explanation will be made of a fourth embodiment of the image detector according to the present invention.

Figure 4:
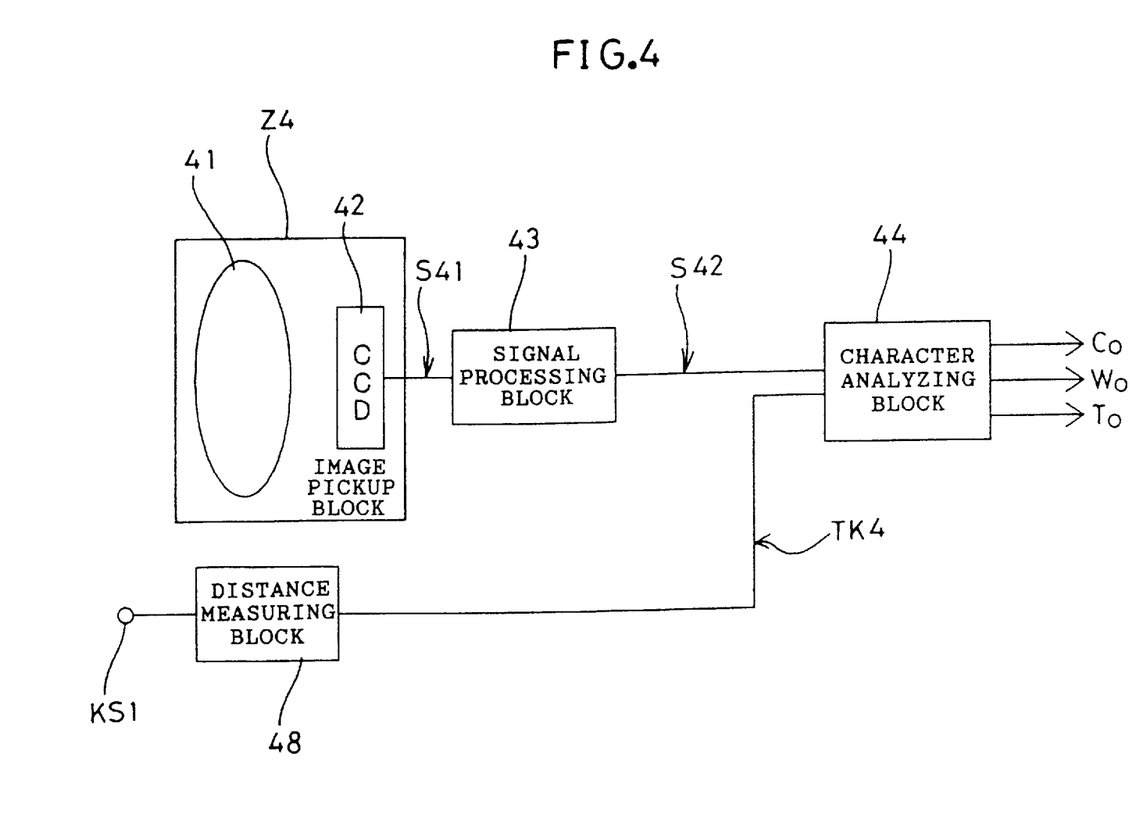
FIG. 4 is a block diagram illustrating a configuration of a fourth embodiment of the image detector according to the present invention.

FIG. 4 is a block diagram illustrating a configuration of the fourth embodiment of the image detector. In FIG. 4, a reference numeral Z4 represent an image pickup block which is composed of a lens 41 and an image sensor 42 used as an image pickup device, a reference numeral 43 designates a signal processing block, a reference numeral 44 denotes a character analyzing block and a reference numeral 48 represents a distance measuring block used as a character detection block.

Operations of the image detector composed of the blocks mentioned above will be described below.

In FIG. 4, the image pickup block Z4 outputs a pickup image signal S41 corresponding to an image of an object picked up by the image sensor 42 by way of the lens 41. The signal processing block 43 generates a video signal S42 corresponding to the pickup image signal S41 by performing a predetermined processing of the pickup image signal S41 provided from the image pickup block Z4. The distance measuring block 48 detects, as character variables TK4 of the object, variations per unit time of a distance to the object which are detected by a distance sensor KS1. On the basis of the character variables TK4 provided from the distance measuring block 48, the character analyzing block 44 divides the video signal S42 provided from the signal processing block 43 into signals at durations TO each having the same character variable, and outputs divided video signals CO after performing characterizing processings of these signals. As the characterizing processings, the character analyzing block 44 adds, to each of the divided video signals CO, an importance degree WO of the divided video signal determined according to the character variables TK4 of the object of the video signal CO and a measured duration TO of the divided video signal.

A fifth embodiment of the image detector according to the present invention will be described.

Figure 5:
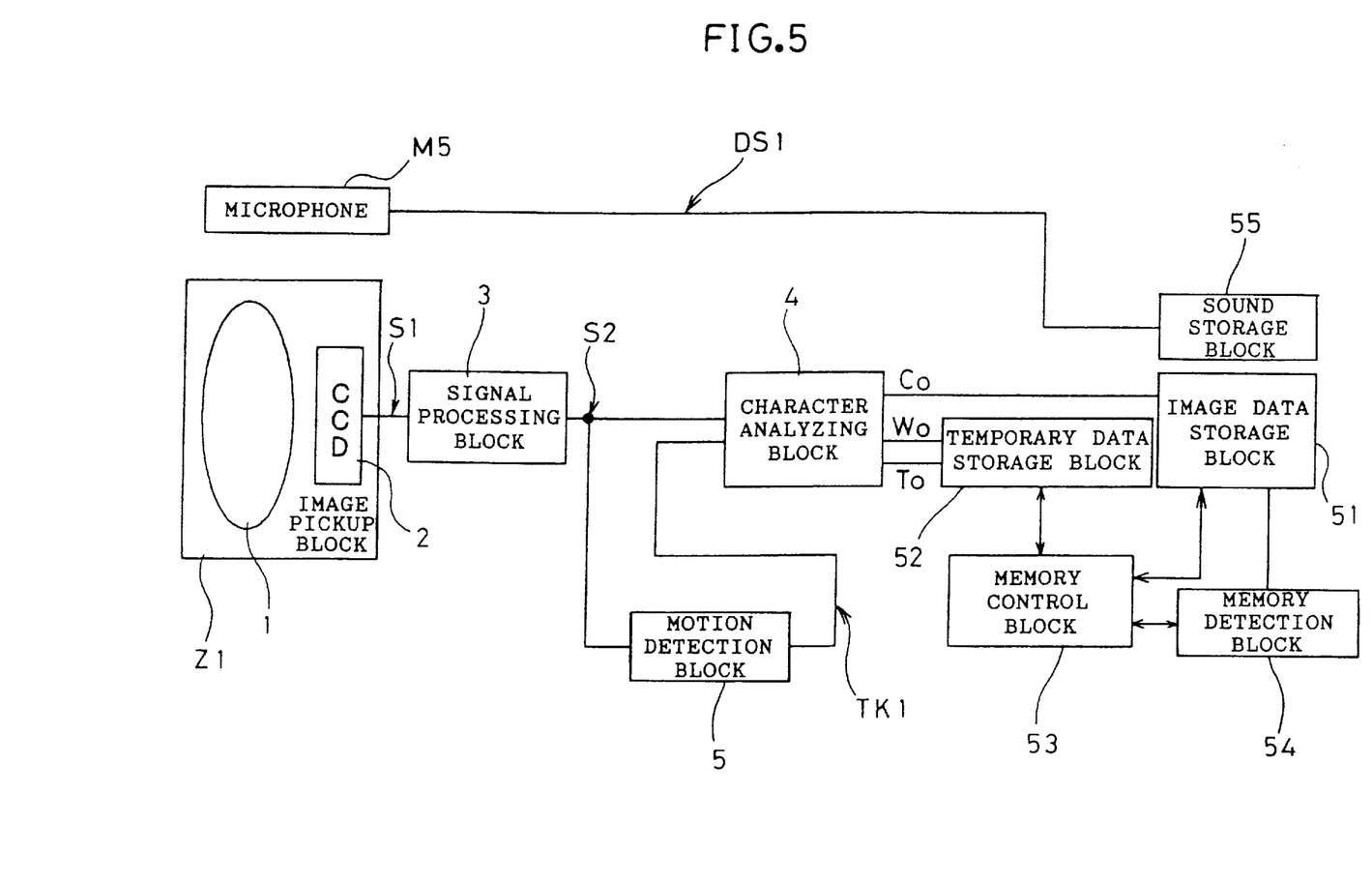
FIG. 5 is a block diagram illustrating a configuration of a fifth embodiment of the image detector according to the present invention.

FIG. 5 is a block diagram illustrating a configuration of the fifth embodiment of the image detector. In FIG. 5, a reference numeral 51 represents an image data storage block, a reference numeral 52 designates a temporary data storage block, a reference numeral 53 denotes a memory control block, a reference numeral 54 represents a memory detection block, a reference numeral 55 designates a sound storage block and a reference numeral M5 denotes a microphone: these blocks being added in the configuration of the image detector preferred as the first embodiment shown in FIG. 1.

Explanation will be made of operations of the image detector which is composed of the members mentioned above. Operations of the fifth embodiment until a stage where a character analyzing block 4 outputs divided video signals CO, importance degrees WO and durations TO on the basis of a pickup image signal S1 provided from an image pickup block Z1 are the same as those of the first embodiment shown in FIG. 1 and will not be described in particular.

In FIG. 5, the image recording block 51 records the divided video signals CO provided from the character analyzing block 4 of the image detector of the first embodiment shown in FIG. 1. The temporary data storage block 52 records the importance degrees WO and durations TO of the divided video signals CO. The memory detection block 54 detects a rest capacity of the data storage block 51 which is usable for recording. In accordance with the importance degrees WO and the durations TO of the divided video signals stored in the temporary data storage block 52 as well as the rest capacity of the image data storage block 51 detected by the memory detection block 54, the memory control block 53 controls recording operations of the image data storage block 51 for the divided video signals CO from the character analyzing block 4. In the fifth embodiment, the memory control block 53 controls the recording operations of the image data storage block 51 so that it records only data of higher importance is stored in the image data storage block 51 in accordance with the importance degrees WO, the durations TO and the rest capacity of the image data storage block 51, or so that it selectively detects and records in the image storage block 51 only images of higher importance out of the divided video signals CO from the character analyzing block 4 while effacing unnecessary data.

The sound storage block 55 continuously records sound signals DS1 corresponding to sounds of an object detected through the microphone M5 in the ordinary recording mode.

In the image detector preferred as the fifth embodiment, the memory detection block 54 may be omitted, and the memory control block 53 may be configured to control the recording operations of the image data storage block 51 so that it records the divided video signals CO from the character analyzing block 4 in accordance with the importance degrees WO and durations TO of the divided video signals in the temporary data storage block 52.

Though the image detector preferred as the fifth embodiment is configured to records the signals which are provided from the character analyzing block of the first embodiment shown in FIG. 1, it can be configured to record the signals provided from the character analyzing blocks of the second embodiment, the third embodiment and the fourth embodiment.

Description will be made of a sixth embodiment of the image detector according to the present invention.

Figure 6:
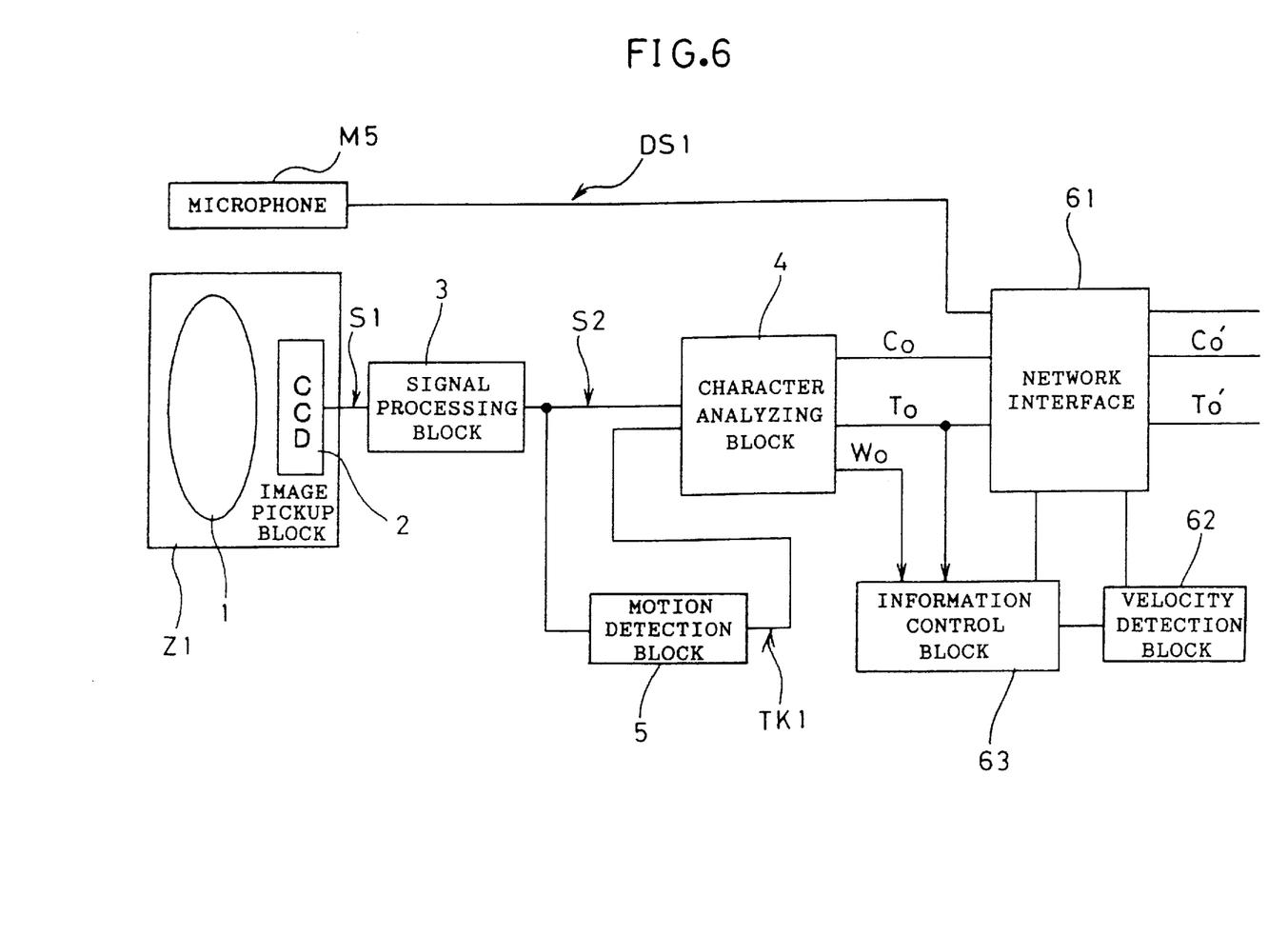
FIG. 6 is a block diagram illustrating a configuration of a sixth embodiment of the image detector according to the present invention.

FIG. 6 is a block diagram illustrating a configuration of an image detector preferred as the sixth embodiment. In FIG. 6, a reference numeral 61 represents a network interface, a reference numeral 62 designates a velocity detection block, a reference numeral 63 denotes an information control block and a reference numeral M5 represents a microphone: these components being used in addition to those disposed in the image detector preferred as the first embodiment shown in FIG. 1.

Operations of the image detector composed of the components mentioned above will be described below. Operations of the sixth embodiment until a stage where a character analyzing block 4 outputs divided video signals CO, importance degrees WO and durations TO on the basis of a pickup image signal S1 from an image pickup block Z1 are the same as the first embodiment of the image detector shown in FIG. 1 and will not be explained in particular.

In FIG. 6, the network interface 61 modulates the divided video signals CO and the durations TO provided from the character analyzing block 4 of the image detector shown in FIG. 1 as the first embodiment into divided video signals CO' and durations TO' for transmission. The velocity detection block 62 detects a capability of a communication network of the network interface 61 during communication. In accordance with the importance degrees WO and the durations TO provided from the character analyzing block 4 as well as the capacity of the communication network detected by the velocity detection block 62, the information control block 63 controls communicating operations of the network interface 61 for the divided video signals CO and the durations TO from the character analyzing block 4. In the sixth embodiment, the information control block 63 controls in accordance with importance degrees WO, duration 10 and on the capacity of communication line the communicating operations of the network interface 61 so that the network interface 61 transmits only important data or only important images selectively detected out of the divided video signals CO provided from the character analyzing block 4 without transmitting unnecessary data.

Sound signals DS1 corresponding to sounds of an object which are detected through the microphone M5 are continuously transmitted by the network interface in the ordinary mode.

Though the network interface 61 of the sixth embodiment is configured to transmit the divided video signals CO and durations TO thereof provided from the character analyzing block of the first embodiment shown in FIG. 1, the network interface can be configured to transmit the divided video signals CO and the durations TO thereof which are provided from the character analyzer blocks of the second embodiment and the third and fourth embodiments.

Description will be made of a seventh embodiment of the image detector according to the present invention.

Figure 8:
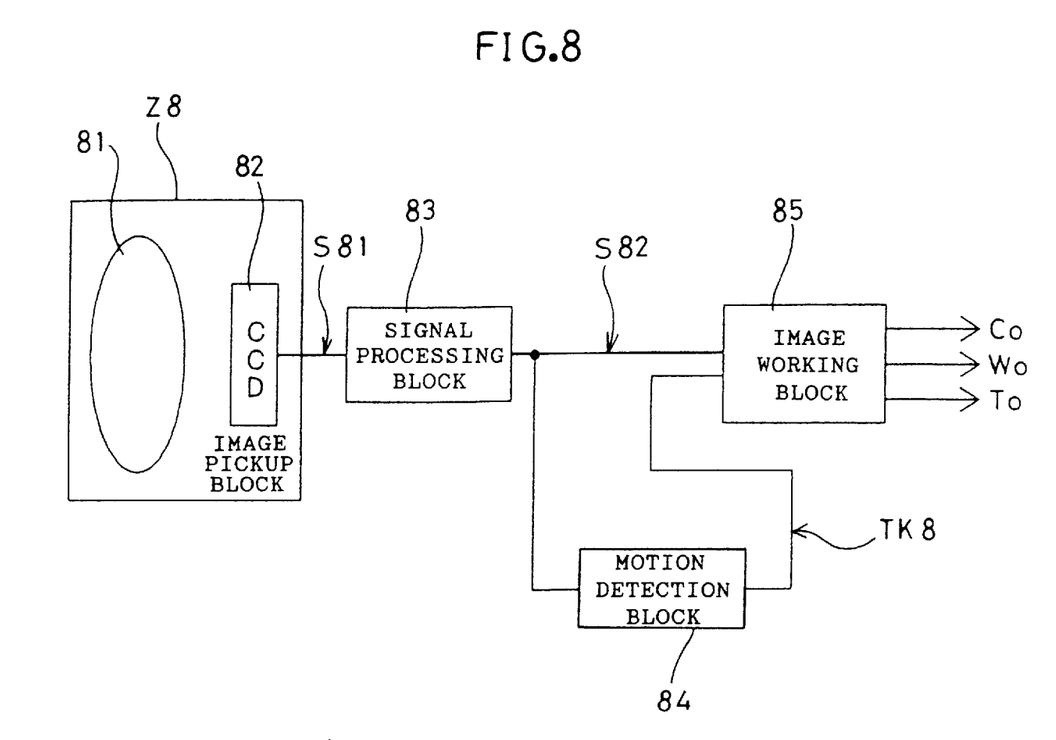
FIG. 8 is a block diagram illustrating a configuration of a seventh embodiment of the image detector according to the present invention.
Figure 9:
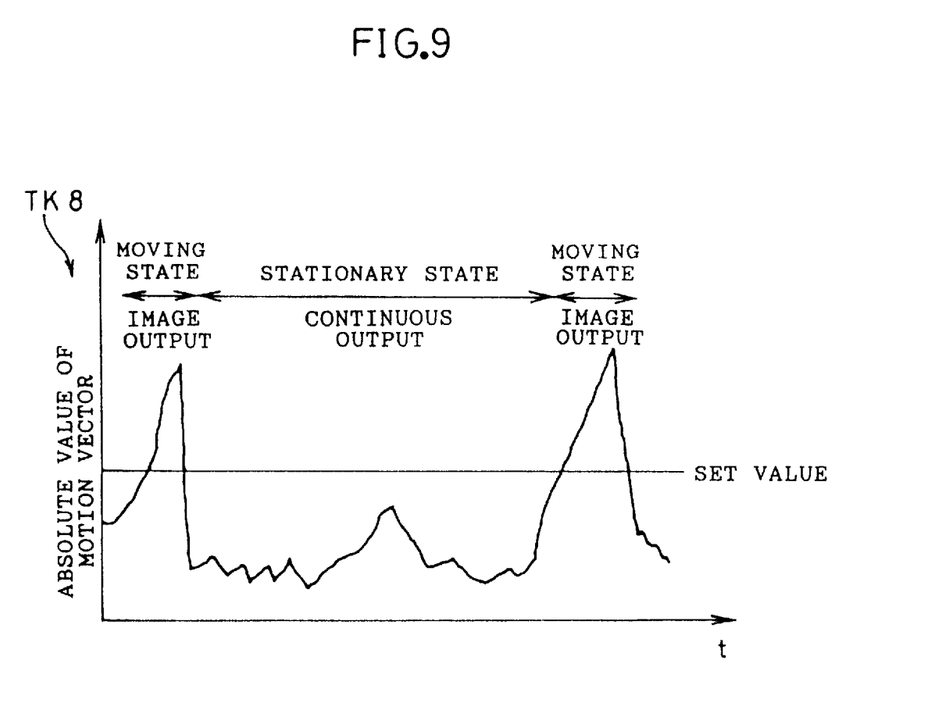
FIG. 9 is a graph descriptive of operations of the seventh embodiment of the present invention.

FIG. 8 is a block diagram illustrating a configuration of the seventh embodiment of the image detector. In FIG. 8, a reference numeral Z8 represents an image pickup block which is composed of a lens 81 and an image sensor 82 used as an image pickup device, a reference numeral 83 designates a signal processing block, a reference numeral 84 denotes a motion detection block, and a reference numeral 85 denotes an image working block.

Operations of the image detector which is composed of the blocks mentioned above will be described below.

In FIG. 8, the image pickup block Z8 outputs a pickup image signal S81 corresponding to an image of an object which is picked up by the image sensor 82 by way of the lens 81. The signal processing block 83 performs a predetermined processing of the pickup image signal S81 from the image processing block Z1, thereby generating a video signal S82 corresponding to the pickup image signal S81. The motion detection block 84 detects variations TK8 per unit time of a spatial motion of a portion or a whole of an image formed on the basis of the video signal S82 from the image processing block 83.

On the basis of the variations TK8 of the image provided from the motion detection block 84, the image working block 85 performs an image working processing of S82 provided from the signal processing block 83 and outputs this signal. The motion detection block 84 detects variations of a length of a motion vector of the image as the variations TK8 of the image. As the image working processing, the image working block 85 judges a moving state or a stationary state of the image by comparing the variations TK8 of the image provided from the motion detection block 84 with a predetermined set value and leaves the video signal as it is when the image is in the moving state or adds a measured duration TO of the image in the stationary state to an original video signal CO when the image is in the stationary state.

In the image detector preferred as the seventh embodiment, the image working block 85 may be configured to output an importance degree WO together with the video signal CO and the duration TO of the image in the stationary state, whereby the video signal CO from the image working block 85, the importance degree WO and the duration TO are processed in a manner similar to that in the fifth embodiment of the image detector shown in FIG. 5, and the video signal CO provided from the image working block 85 is recorded in an image data storage block 51.

In the seventh embodiment of the image detector, the image working block 85 may be configured to output an importance degree WO of an image together with the video signal CO and the duration TO of the image in the stationary state, so that the video signal CO, the importance degree WO and the duration TO of the video signal provided from the image working block 85 are processed in a manner similar to that in the sixth embodiment of the image detector shown in FIG. 6, and the video signal CO, and the duration TO of the image in the stationary state provided from the image working block 85 are modulated by the network interface 61 before transmission.

The seventh embodiment of the image detector may be modified so as to be equipped with a display (not shown) which displays the video signal CO from image working block 85 in such a manner that it presents an image from the corresponding to all video signals CO1 in the moving stage from the image working block 85 and display an image corresponding to video signals CO2 in the stationary state from the image working block 85 only within a period of time specified by the duration TO.

Each of the embodiments described above operates to permit detecting images of higher importance, or selectively detecting and storing images of higher importance in memories while effacing unnecessary data in recording picked up image data in memories, thereby making it possible to economically use memory capacities, accelerate operations for retrieving image data in memories by recording required minimum amounts of data in memories, lessen loads on transmission systems by lowering spatial ratios occupied by the transmission systems for transmitting picked up images and transmit important image data free from degradation of qualities.

We claim:

1. An image detector comprising:
    an image pickup block which outputs a pickup image signal corresponding to an image of an object picked up from an image pickup device by a lens;
    a signal processing block which generates a video signal corresponding to said pickup image signal by performing a predetermined processing of the pickup image signal provided from said image pickup block;
    a character detection block which detects variations per unit time of at least one of luminance and color of a portion or a whole of an image formed by the video signal provided from said signal processing block as character variables of said image; and
    a character analyzing block which divides, according to the character variables provided from said character detection block, the video signal provided from said signal processing block into signals at durations that each have the same character variable, and the character analyzing block outputs the divided video signals after performing characterizing processings thereof;

wherein said character analyzing block is configured to add to each one of the divided video signals, an importance degree determined by the character variables of the image and a measured duration of each divided video signal as the characterizing processings.

2. An image detector comprising:

an image pickup block which outputs a pickup image signal corresponding to an image of an object picked up from an image pickup device by a lens;

a signal processing block which generates a video signal corresponding to said pickup image signal by performing a predetermined processing of the pickup image signal provided from said image pickup block;

a character detection block which detects variations of per unit time of a spatial motion of at least one of a portion and a whole of an image formed on the basis of the video signal provided from said signal processing block as character variables of said image; and a character analyzing block which divides, according to the character variables provided from said character detection block, the video signal provided from said character processing block into signals at durations that each have the same character variable, and the character analyzing block outputs the divided video signals after performing characterizing processings of the divided video signals;

wherein said character detection block is configured to detect variations of a length of a motion vector of the image as variations of the image which are used as said character variables of the image, and said character analyzing block adds to each one of the divided video signals, an importance degree determined by the character variables of the image and a measured duration of each divided video signal as the characterizing processings.

3. An image detector according to claim 2, wherein said character analyzing block is configured to add an importance degree having a maximum value for a divided video signal having a motion vector whose length exceeds a predetermined set value continuously for a first set time and then continuously for a second set time.

4. An image detector comprising:

an image pickup block which outputs a pickup image signal corresponding to an image of an object picked up from an image pickup device by a lens;

a signal processing block which generates a video signal corresponding to said pickup image signal by performing a predetermined processing of the pickup image signal provided from said image pickup block;

a character detection block which detects variations per unit time of a color of at least one of a portion and a whole of an image formed according to the video signal provided from said signal processing block as character variables of said image; and a character analyzing block which divides, according to the character variables provided from said character detection block, the video signal provided from said signal processing block into signals at durations that each have the same character variable, and the character analyzing block outputs the divided video signals after performing characterizing processings thereof;

wherein said character analyzing block is configured to detect variations of a skin color volume in the image as variations of the image which are to be used as said character variables of the image, and said character analyzing block is configured to add to each one of the divided video signals, an importance degree determined according to the character variables of the image and a measured duration of each divided video signal as the characterizing processings.

5. An image detector comprising:

an image pickup block which outputs a video signal corresponding to an image of an object picked up from an image pickup device by a lens;

a signal processing block which generates a video signal corresponding to the pickup image signal by performing a predetermined processing of the pickup image signal provided from said image pickup block;

a character detection block which detects variations per unit time of a volume of a sound detected from said object as character variables of said object; and a character analyzing block which divides, according to the character variables provided from said character detection block, the video signal provided from said signal processing block into signals at durations that each have the same character variable as that of said object, and the character analyzing block outputs the divided video signals after performing characterizing processings thereof;

wherein said character analyzing block is configured to add to each one of the divided video signals, an importance degree of the divided video signals, an importance degree determined according to the character variables of said object of the image and a measured duration of each divided video signal as the characterizing processings.

6. An image detector comprising:

an image pickup block which outputs a pickup image signal corresponding to an image of an object picked up from an image pickup device by a lens;

a signal processing block which generates a video signal corresponding to the pickup image signal by performing a predetermined processing of the pickup image signal provided from said image pickup block;

a character detection block which detects variations per unit time of a distance to said object as character variables of said object; and a character analyzing block which divides, according to the character variables provided from said character detection block, the video signal provided from said signal processing block into signals at durations that each have the same character variable as that of said object, and the character analyzing block outputs the divided video signals after performing characterizing processings thereof;

wherein said character analyzing block is configured to add to each one of the divided video signals, an importance degree determined according to the character variables of said object of the image and a measured duration of each divided video signal as the characterizing processings.

7. An image detector according to claim 1 further comprising an image data storage block which records the divided video signals provided from the character analyzing block, a temporary data storage block which records the importance degrees and durations provided from said character analyzing block, and a memory control block which controls recording operations of each of said storage blocks, wherein said memory control block is configured to control recording operations of said image data storage block according to the importance degrees and the durations in said temporary data storage block.

8. An image detector according to claim 7 further comprising an image data storage block which records the divided video signals provided from the character analyzing block, a temporary data storage block which records the importance degrees and the durations of the divided video signals provided from said character analyzing block, a memory control block which controls recording operations of each of said storage blocks and a memory detection block which detects a remaining recording capacity of said image data storage block, wherein said memory control block is configured to control the recording operations of said image data storage block according to the importance degrees and the durations in said temporary data storage block as well as the remaining recording capacity detected by said memory detection block.

9. An image detector according to claim 1 further comprising a network interface which transmits the divided video signals and durations thereof provided from the character analyzing block for communication, a velocity detection block which detects a capability of a communication circuit of the network interface during communication, and an information control block which controls communication through said network interface, wherein said information control block is configured to control the communication through said network interface according to the importance degrees and the durations of the divided video signals provided from said character analyzing block as well as the capability of the communication circuit detected by said velocity control block.

10. An image detector comprising:
an image pickup block which outputs a pickup image signal corresponding to an image of an object picked up by an image pickup device by a lens;
a signal processing block which generates a video signal corresponding to the pickup image signal by performing a predetermined processing of the pickup image signal provided from said image pickup block;
a motion detection block which detects variations per unit time of a spatial motion of at least one of a portion or a whole of an image formed on the basis of the video signal provided from said signal processing block; and
an image working block which outputs the video signal provided from said signal processing block after performing an image working processing thereof according to said variations of the image detected by said motion detection block;
wherein
said motion detection block is configured to detect variations of a length of a motion vector of the image as the variations of said image, and said image working block is configured to judge a moving state or a stationary state of the image by comparing the variations of the image provided from said motion detection block with a predetermined set value, so that the video signal is left as when the image is in the moving state and a measured duration of the image in the stationary state is added to the original video signal when the image is in the stationary state, as the image working processings.

11. An image detector according to claim 10, further comprising an image data storage block which records the video signal provided from the image working block, a temporary data storage block which records the duration of the image provided from said image working block, and a memory control block which controls recording operations of each of said storage blocks, wherein said memory control block is configured to control recording operations of said image data storage block according to the duration of the image in said temporary data storage block.

12. An image detector according to claim 10, further comprising an image data storage block which records the video signal provided from the image working block, a temporary data storage block which records the duration of the image provided from said image working block, a memory control block which controls recording operations of each of said data storage blocks, and a memory detection block which detects a remaining recording capacity of said image data storage block, wherein said memory control block is configured to control recording operations of said image data storage block according to the duration of the image in said temporary data storage block and the remaining recording capacity of the image data storage block detected by said memory detection block.

13. An image detector according to claim 10, further comprising a network interface which transmits the video signal and the duration provided from the image working block for communication, a velocity detection block which detects a capability of a communication circuit of said network interface during communication, and an information control block which controls communication through said network interface, wherein said information control block is configured to control the communication through said network interface according to the duration of the image provided from said image working block and the capability of the communication circuit detected by said velocity detection block.

14. An image detector according to claim 10, further comprising a display block which displays 1) an image corresponding to the video signal provided from the image working block throughout a duration thereof when the image is in the moving state and 2) an image corresponding to the video signal provided from the image working block only for a period of time specified by the duration thereof when the image is in the stationary state.

* * * * *